(12) United States Patent
Gulker et al.

(10) Patent No.: US 8,333,423 B2
(45) Date of Patent: Dec. 18, 2012

(54) FALSE DIVISION BAR FOR MINIMIZING WIND THROB NOISE

(75) Inventors: William S. Gulker, Beverly Hills, MI (US); Steven C. Dworack, Rochester Hills, MI (US); Scott D. Conn, White Lake, MI (US); Artem Poliakov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1020 days.

(21) Appl. No.: 11/939,132

(22) Filed: Nov. 13, 2007

(65) Prior Publication Data

US 2009/0121517 A1    May 14, 2009

(51) Int. Cl.
*B60J 1/00* (2006.01)
(52) U.S. Cl. ................................... 296/180.1
(58) Field of Classification Search ............. 296/180.1, 296/146.1, 91, 146.2
See application file for complete search history.

(56) References Cited

U.S. PATENT DOCUMENTS

| | | | | |
|---|---|---|---|---|
| 1,770,747 | A * | 7/1930 | Crowell | 49/374 |
| 4,139,234 | A * | 2/1979 | Morgan | 296/201 |
| 4,322,132 | A * | 3/1982 | Derr | 359/844 |
| 4,357,781 | A * | 11/1982 | Ohya et al. | 49/227 |
| 4,502,248 | A * | 3/1985 | Thomas et al. | 49/374 |
| 4,761,916 | A * | 8/1988 | Sanok et al. | 49/381 |
| 4,927,207 | A * | 5/1990 | Kishino | 49/490.1 |
| 5,139,307 | A * | 8/1992 | Koops et al. | 296/201 |
| 5,251,953 | A * | 10/1993 | Willey | 296/152 |
| 5,557,890 | A * | 9/1996 | Levy et al. | 49/502 |
| 5,676,418 | A * | 10/1997 | Strefling | 296/180.1 |
| 5,812,684 | A * | 9/1998 | Mark | 296/146.1 |
| 5,846,463 | A * | 12/1998 | Keeney et al. | 264/135 |
| 6,070,363 | A * | 6/2000 | Vance | 49/377 |
| 6,220,650 | B1 * | 4/2001 | Davis et al. | 296/146.16 |
| 6,260,905 | B1 * | 7/2001 | Wagner | 296/146.16 |
| 6,276,748 | B1 * | 8/2001 | Gobessi et al. | 296/190.02 |
| 6,299,235 | B1 * | 10/2001 | Davis et al. | 296/146.16 |
| 6,394,529 | B2 * | 5/2002 | Davis et al. | 296/146.16 |
| 6,572,176 | B2 * | 6/2003 | Davis et al. | 296/146.16 |
| 6,663,165 | B2 * | 12/2003 | Naito et al. | 296/146.2 |
| 6,729,674 | B2 * | 5/2004 | Davis et al. | 296/146.16 |
| 6,817,651 | B2 * | 11/2004 | Carvalho et al. | 296/146.2 |
| 6,869,128 | B2 * | 3/2005 | Farrar et al. | 296/146.16 |
| 6,991,531 | B2 * | 1/2006 | Wijaya et al. | 454/130 |
| 7,044,848 | B2 * | 5/2006 | Wijaya et al. | 454/128 |
| 7,172,240 | B1 * | 2/2007 | Kaufman | 296/152 |
| 7,425,032 | B2 * | 9/2008 | Morikawa et al. | 296/146.1 |
| 7,874,104 | B2 * | 1/2011 | Kimoto et al. | 49/502 |
| 8,042,859 | B2 * | 10/2011 | Kimoto | 296/146.2 |

(Continued)

FOREIGN PATENT DOCUMENTS

JP    2000301943    10/2000

*Primary Examiner* — Kiran B Patel
(74) *Attorney, Agent, or Firm* — Raymond L. Coppiellie; Price Heneveld LLP

(57) ABSTRACT

A false division bar assembly for minimizing wind noise generated during movement of a vehicle including a retractable rear window. The assembly includes a division bar mountable in a vehicle rear door window opening to create at least two air passages on opposite sides of the division bar within the vehicle rear door window opening, to thereby minimize wind noise generated during movement of the vehicle when the vehicle front windows are closed with the vehicle rear windows being opened.

5 Claims, 5 Drawing Sheets

U.S. PATENT DOCUMENTS

| | | | |
|---|---|---|---|
| 8,127,499 B2 * | 3/2012 | Iacovoni et al. | 49/441 |
| 8,151,521 B2 * | 4/2012 | Iwabuchi | 49/502 |
| 8,186,741 B2 * | 5/2012 | Lynam et al. | 296/146.2 |
| 2002/0003356 A1 * | 1/2002 | Davis et al. | 296/146.16 |
| 2002/0096800 A1 * | 7/2002 | Keeney et al. | 264/252 |
| 2002/0140251 A1 * | 10/2002 | Davis et al. | 296/146.16 |
| 2003/0168882 A1 * | 9/2003 | Naito et al. | 296/146.2 |
| 2003/0193212 A1 * | 10/2003 | Davis et al. | 296/146.16 |
| 2006/0059799 A1 * | 3/2006 | Zimmer et al. | 52/204.1 |
| 2006/0103047 A1 * | 5/2006 | Zwolinski | 264/174.11 |
| 2007/0068638 A1 | 3/2007 | Puskarz et al. | |
| 2008/0224501 A1 * | 9/2008 | Zimmer et al. | 296/201 |

* cited by examiner

FALSE DIVISION BAR FOR MINIMIZING WIND THROB NOISE

BACKGROUND OF INVENTION a. Field of Invention

The invention relates generally to vehicle structural design for noise control, and more particularly, to the structural design of vehicle rear doors and their related components for minimizing wind generated noise.

b. Description of Related Art

As is known in the art, automobiles include a variety of interior and exterior structural components whose design is governed by a variety of performance factors, some of which are related to minimizing noise within the occupant compartment. Such noise related performance factors themselves are limited in their application due to aesthetic or functional considerations. For example, whereas vents and other such components may be provided for minimizing wind related noise when one or more windows are opened, such components may however be undesirable from an aesthetics viewpoint.

One such area of wind related noise includes noise generated when automobile front windows are closed, with the rear windows being open. The noise generated in such a condition is often referred to as wind throb or "helicopter" noise, and is especially prevalent in sport utility vehicles (SUVs). While this noise can be reduced by partially or fully opening the front windows for thus providing adequate venting for the vehicle occupant compartment, many drivers are unaware of the source, much less the remedy for such noise. Moreover, in certain conditions where it is desirable for an operator to have the front windows fully closed with the rear windows opened, venting of the passenger compartment may not be an option.

In the art, as disclosed for example in U.S. Pat. No. 6,729,674 to Davis and U.S. Publication No. 2006/0059799 A1 to Zimmer, there exists a variety of techniques and devices for minimizing wind generated noise.

Referring to FIG. 1 of Davis, there is disclosed a window assembly including movable window (18) retractable into vehicle door (12), with window (18) slidably engaging dividing member (22). A rail or guide member (24) slidably engages a channel or track (22a) of dividing member (22). As shown in FIGS. 1, 2, 8A and 8B, this allows fixed window panel (16) and movable window panel (18) to be substantially flushed-mounted relative to one another, such that the outer surface of both window panels form a continuous planar surface. The absence of the protruding edge of the dividing bar prevents development of additional turbulence and minimizes noise, in accordance with the purpose of the Davis invention (see Col. 2:35-41; Col. 3:35-41; Col. 4:39 to Col. 5:11).

While the movable window (18) of Davis affects wind generated noise within the vehicle occupant compartment, the Davis assembly however has several drawbacks from an aesthetics and functional standpoint. From an aesthetics standpoint, the Davis assembly clearly includes two separate windows that alter the vehicle appearance when the windows are opened or closed. From a functional standpoint, the Davis assembly requires the manufacture of separate windows and related components, thus significantly adding to the overall cost of the assembly. Moreover, the Davis assembly does not allow the overall window opening to be used due to the fixed and necessary requirement of dividing member (22).

In another such device for minimizing wind generated noise, Zimmer discloses in FIGS. 3 and 4 thereof an invisible division bar assembly (80). The division bar spans the interface between movable window (30) and fixed window (32). The joint between the movable and fixed windows does not extend outwardly beyond the plane defined by the exterior surface of the movable and fixed windows. This flush arrangement reduces issues with respect to wind noise, according to the purpose of the Zimmer invention (see Paragraphs 2, 3, 6, 13 and 24-26).

The invisible division bar assembly of Zimmer is also problematic from a functional standpoint in that the assembly is primarily directed to eliminating turbulence caused by a protruding division bar, and not to the wind throb or "helicopter" noise generated when the rear windows are open with the front windows being closed.

It is therefore desirable to provide a component for minimizing wind related noise, especially, the wind throb or "helicopter" noise generated when the rear windows are open with the front windows being closed, without the design being obtrusive from a manufacturing or aesthetics standpoint. It is also desirable to provide a component for minimizing wind related noise which does not require special manufacturing considerations and is not therefore cost prohibitive.

SUMMARY OF THE INVENTION

The invention solves the problems and overcomes the drawbacks and deficiencies of prior art noise reduction devices by providing a false division bar assembly for minimizing wind noise generated during movement of a vehicle including a retractable rear window, and especially the wind throb or "helicopter" noise generated when the rear windows are open with the front windows being closed. The assembly may include a division bar mountable in a vehicle rear door window opening to create at least two air passages on opposite sides of the division bar within the vehicle rear door window opening, to thereby minimize wind noise generated during movement of the vehicle.

For the assembly described above, in a particular embodiment, the division bar may be disposed at approximately ⅓ the length of the vehicle rear door window opening from an opening end adjacent a vehicle rear end. In a particular embodiment, the division bar may include a width of approximately 30-60 mm, and a thickness of approximately 15-30 mm. Yet further, the division bar may be retractable within a vehicle rear door. The division bar may also provide a wind generated noise reduction of at least 16 dB, and be optionally provided in a vehicle front door.

The invention also provides a false division bar assembly for minimizing wind noise generated during movement of a vehicle. The assembly may include a division bar mountable in a vehicle door window opening to create at least two air passages on opposite sides of the division bar within the vehicle door window opening, to thereby minimize wind noise generated during movement of the vehicle.

For the assembly described above, in a particular embodiment, the division bar may include a width of approximately 30-60 mm, and a thickness of approximately 15-30 mm. Yet further, the division bar may be retractable within a vehicle door, and may also provide a wind generated noise reduction of at least 16 dB.

The invention yet further provides a vehicle including a false division bar assembly for minimizing wind noise generated during movement of the vehicle having a retractable rear window. The assembly may include a division bar mountable in a vehicle door window opening to create at least two air passages on opposite sides of the division bar within the vehicle door window opening, to thereby minimize wind noise generated during movement of the vehicle when the vehicle front windows are closed with the vehicle rear windows being opened.

For the assembly described above, in a particular embodiment, the division bar may include a width of approximately 30-60 mm, and a thickness of approximately 15-30 mm. Yet further, the division bar may be retractable within a vehicle door, and may also provide a wind generated noise reduction of at least 16 dB.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide her explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
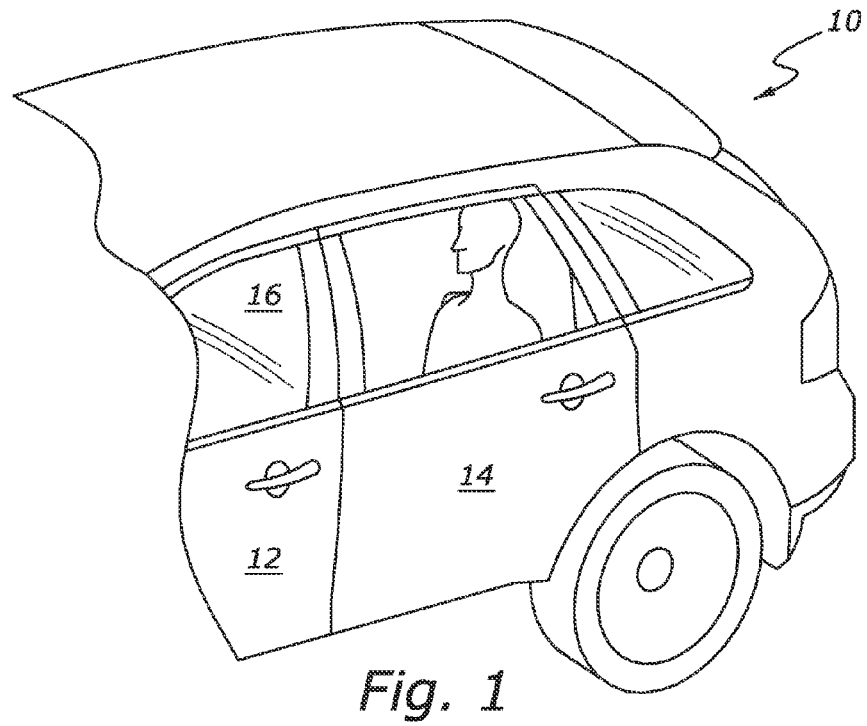
FIG. 1 is an isometric view of an automobile including a false division bar according to the present invention, with the automobile front windows closed and the rear windows open, and the false division bar being disposed in a retracted configuration.

Referring now to the drawings wherein like reference numerals designate corresponding parts throughout the several views, FIGS. 1-8 illustrate various views and related performance graphs of an automobile including a false division bar according to the present invention.

Figure 2:
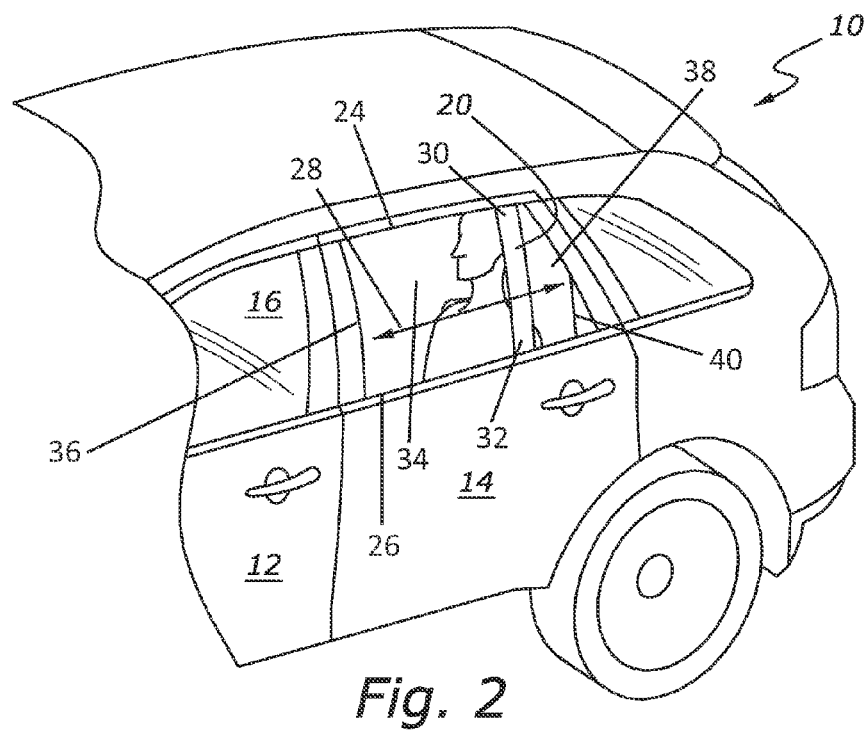
FIG. 2 is an isometric view of the automobile of FIG. 1, with the automobile front windows closed and the rear windows open, and the false division bar being disposed in an extended configuration.
Figure 3:
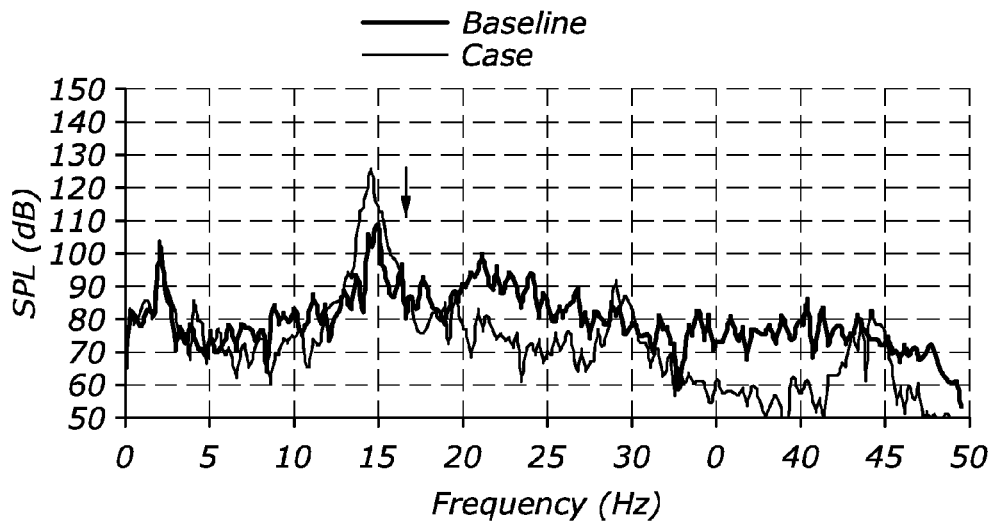
FIG. 3 is a graph of wind throb related noise, illustrating noise reduction for an automobile equipped with and without a false division bar according to the present invention.
Figure 5:
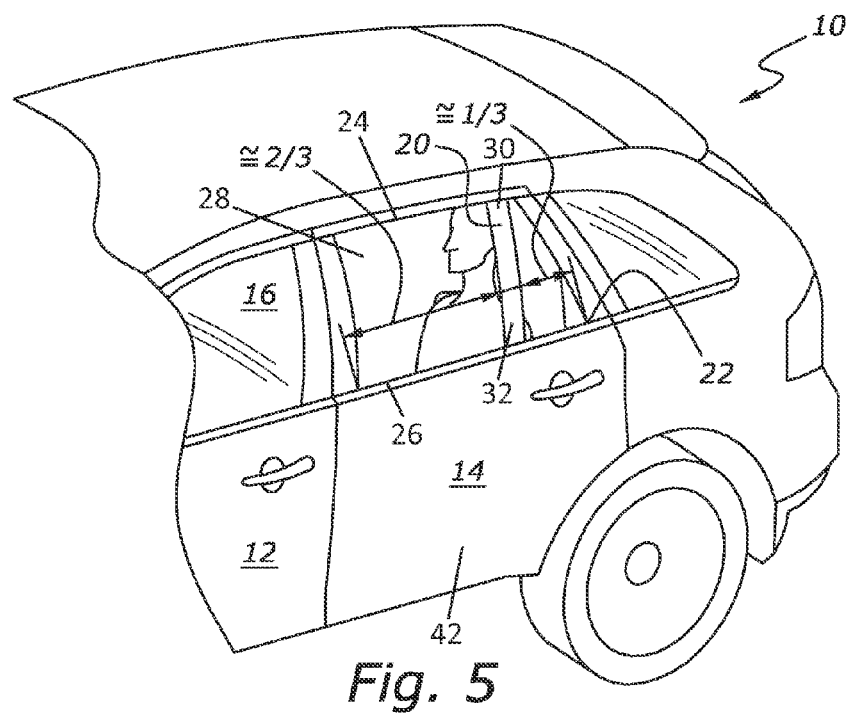
FIG. 5 is an isometric view of the automobile of FIG. 1, with the automobile front windows closed and the rear windows open, with the view illustrating an exemplary location for the false division bar according to the present invention.
Figure 6:
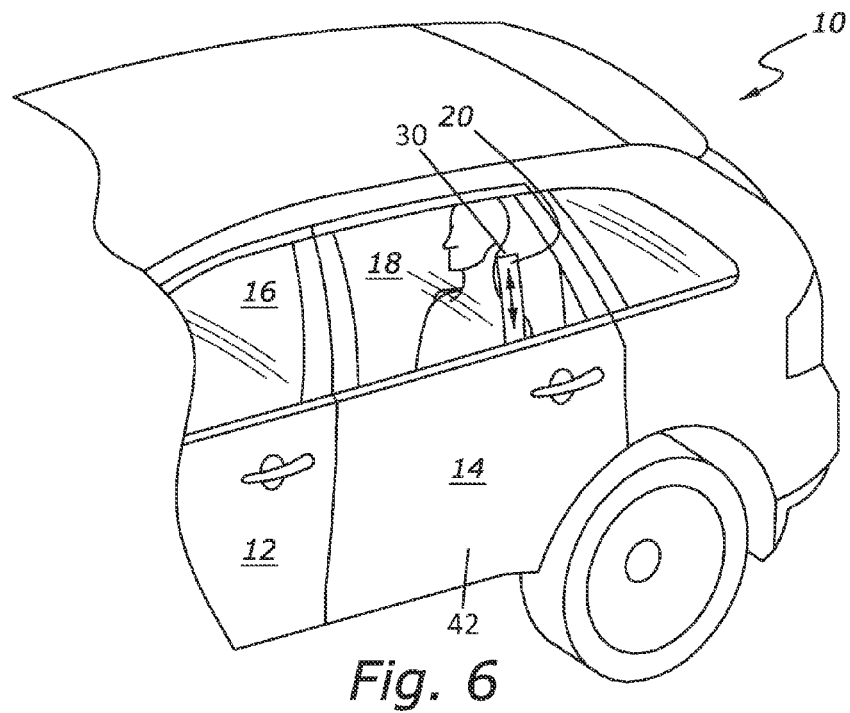
FIG. 6 is an isometric view of the automobile of FIG. 1, with the automobile front windows closed and the rear windows open, with the automobile including a retractable false division bar.
Figure 7:
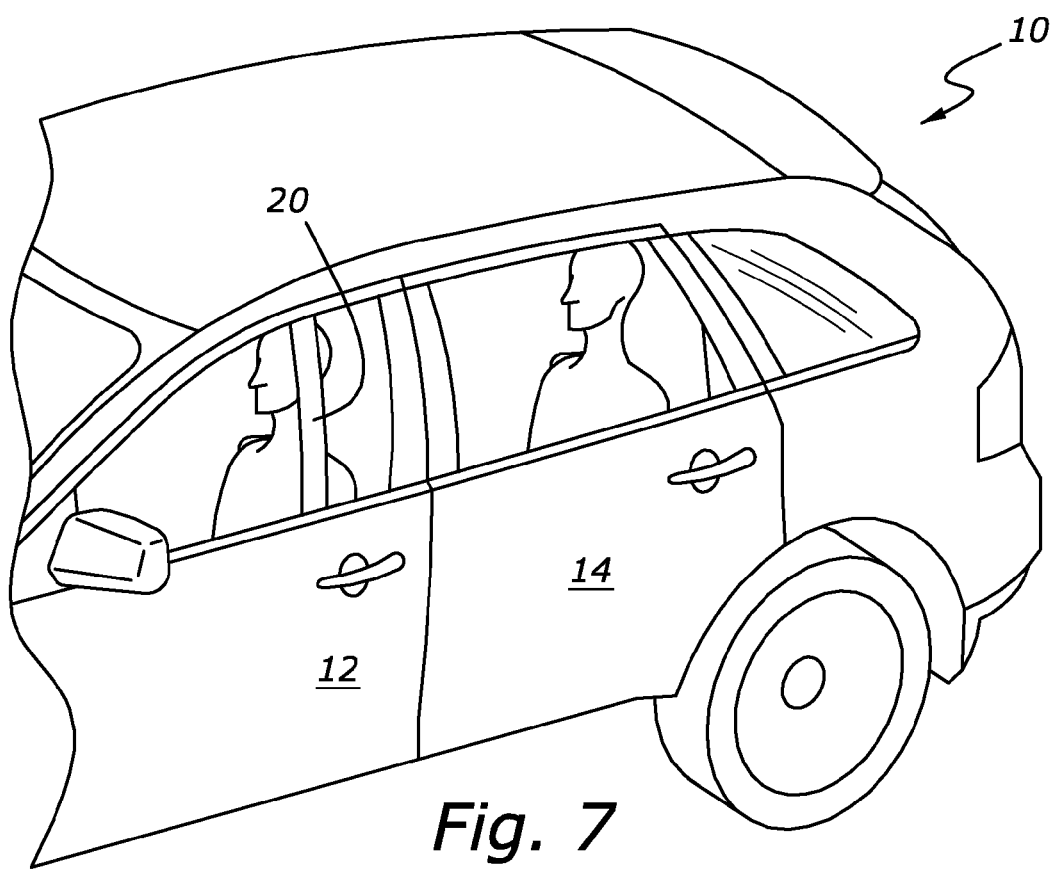
FIG. 7 is an isometric view of the automobile of FIG. 1, with the automobile including a false division bar mounted in a front window opening.

Specifically, referring to FIGS. 1 and 2, the invention may generally include an automobile 10 including front and rear doors 12, 14, respectively including front windows 16, and rear windows 18 (FIG. 6). As shown in FIG. 2, rear doors 14 may include a false division bar 20 which may be fixedly or retractably mounted to an interior trim panel of doors 14, and disposed inboard of rear windows 18. The false division bar assembly includes the division bar 20 and may also include a retracting actuator for a retractably mounted division bar 20 and fasteners for a fixedly mounted division bar 20. As shown in FIG. 2, the division bar 20 extends between an upper periphery 24 and a lower periphery 26 of the rear door window opening 28. A top end 30 of the division bar 20 operably engages the upper periphery 24 and a bottom end 32 of the division bar 20 operably engages the lower periphery 26. A first air passage 34 is created between the division bar 20 and a forward periphery 36 of the rear door window opening 28, proximate the B-pillar. A second air passage 38 is created between the division bar 20 and a rearward periphery 40 of the rear door window opening 28, proximate the C-pillar. As shown in FIG. 5, the first air passage 34 is approximately ⅔ the length of the rear door window opening 28 and the second air passage 38 is approximately ⅓ the length of the rear door window opening 28. In the particular embodiment illustrated, automobile 10 may be a sport utility vehicle (SUV). However those skilled in the art would readily appreciate in view of this disclosure that false division bar 20 may be used with a variety of other automobiles for minimizing wind throb related noise.

Figure 8:
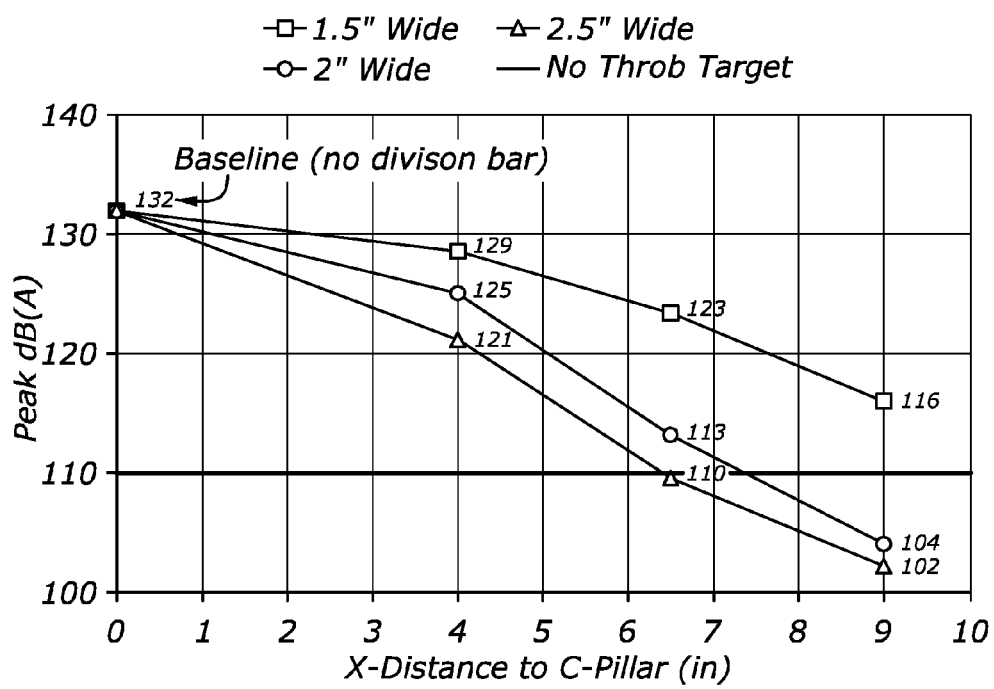
FIG. 8 is a graph of wind throb test results for false division bars of different thicknesses and locations from a vehicle C-pillar.
Figure 4A:
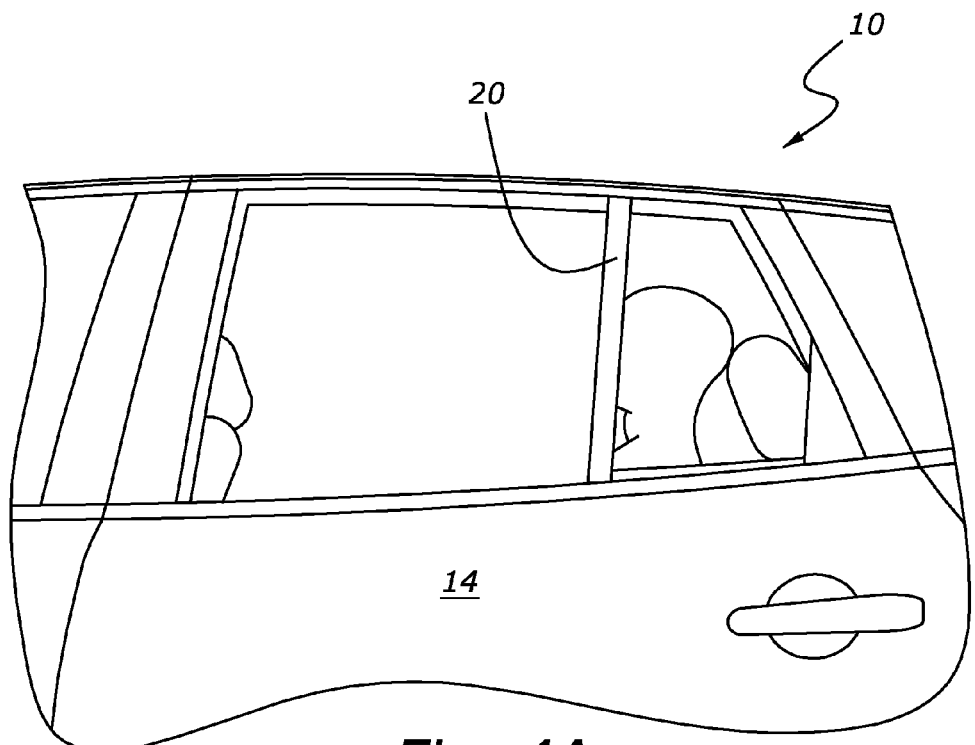
FIGS. 4A and 4B are exemplary side views of the automobile of FIG. 1, illustrating first and second alternative false division bar designs.
Figure 4B:
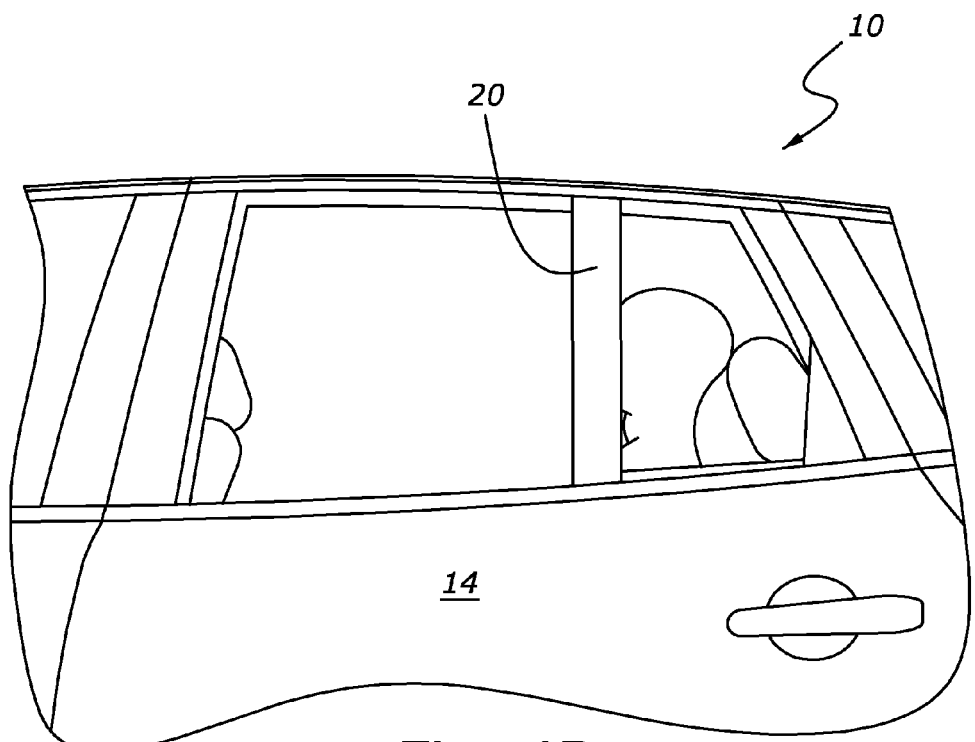

Referring to FIGS. 3, 4A, 4B and 8, in an exemplary embodiment, false division bar 20 may generally include a width of approximately 30-60 mm (i.e. approximately 1.2-2.4"), and a thickness of approximately 15-30 mm (i.e. approximately 0.6-1.2"). In the particular embodiment of FIGS. 3 and 8, a false division bar 20 including a width of between approximately 1.5-2.5" and a thickness of approximately 1" may provide a reduction of approximately 16 dB (see FIG. 3) at approximately 15 Hz as compared to a base sound pressure level (SPL) of approximately 126 dB at approximately 15 Hz. Referring to FIG. 8, for division bars including a width of between approximately 1.5-2.5" and a thickness of approximately 1", the location of the division bar from the vehicle C-pillar primarily governs the wind throb related noise reduction. Further, in the exemplary embodiment of FIG. 8, division bar 20 may be disposed approximately 3-5 mm from rear window 18. Thus, referring again to FIG. 8, it can be seen that for a target wind related noise level of 110 dB(A) at which no throb related noise is detectable, division bars including a width of approximately 2-2.5" and a thickness of approximately 1", with the division bar being located at least approximately 6.5-7.5" from the vehicle C-pillar, the resultant noise level at approximately 60 mph is less than approximately 110 dB(A). Those skilled in the art would readily appreciate in view of this disclosure that the dimensions of false division bar 20 may be changed as needed based on aesthetic considerations, as well as based on acceptable sound levels of wind generated noise. For example, in the particular embodiment of FIG. 4A, false division bar 20 includes a width of approximately 30 mm and a thickness of approximately 15 mm, for thus providing an approximately 20 dB reduction at approximately 15 Hz. For the particular embodiment of FIG. 4B, false division bar 20 includes a width of approximately 60 mm and a thickness of approximately 20 mm, for thus providing an approximately 40 dB reduction at approximately 15 Hz.

Referring next to FIG. 5, as briefly discussed above, the location of the division bar from the vehicle C-pillar primarily governs the wind throb related noise reduction. Thus, in the exemplary embodiment of FIG. 5, false division bar 20 may be generally disposed at approximately ⅓ the distance of rear windows 18 from end 22 of windows 18. Of course, as also discussed above with reference to FIG. 8, those skilled in the art would readily appreciate in view of this disclosure that the dimensions and location of false division bar 20 may be varied and optimized for different vehicles based on theoretical and wind tunnel testing, as well as based on customer aesthetic requirements.

Referring to FIG. 6, in another embodiment, false division bar 20 may be retractably disposable within the door trim panel. In this regard, when rear window 18 is in its closed position of FIG. 6, false division bar 20 may be manually or automatically disposable in its fully extended configuration of FIG. 2. As shown in FIG. 6, the division bar 20 is movable between a retracted position (FIG. 1) and an extended position (FIG. 5) using a retracting actuator operably coupled with the bottom end 32 of the division bar 20. In the retracted position, the division bar 20 is fully concealed and disposed between a door body panel 42 and the door trim panel, such that the top end 30 of the division bar 20 is not within the rear door window opening 28. In the extended position, the top end 32 of the division bar 20 is operably engaged with the upper periphery 24 of the rear door window opening 28 and the division bar 20 extends to the lower periphery 26 of the rear door window opening 28. Further, when rear window 18 is in its fully or partially opened position of FIG. 1, false division bar 20 may remain in its fully extended position of FIG. 2 for providing wind throb related noise reduction. Alternatively, if a user desires, false division bar 20 may be fully retracted for providing a rear seat passenger with an unobstructed view from the window opening for window 18.

To summarize, based on the discussion above, the present invention thus provides a false division bar 20 for minimizing wind related noise, especially, the wind throb or "helicopter" noise generated when the rear windows are open with the front windows being closed. As discussed above, the design and implementation of false division bar 20 is unobtrusive from a manufacturing or aesthetics standpoint in that bar 20 can be added to the rear door interior trim panel in a fixed or retractable configuration.

Those skilled in the art would readily appreciate in view of this disclosure that various modifications could be made to the location and configuration of false division bar 20, without departing from the scope of the present invention. For example, whereas false division bar 20 has been described as being used with a vehicle rear window 18, false division bar 20 may also be used in lieu of a vehicle front window division bar for vehicles that may include a front quarter window. For a SUV or another vehicle including false division bar 20, the vehicle may also be provided with a separately movable quarter window, which may be retracted along with division bar 20 to increase the overall window opening, without requiring the vehicle front windows to be opened. Whereas false division bar 20 has been shown as including a linear configuration, it is conceivable that bar 20 may include a curvature or another non-linear configuration for facilitating passage of air as discussed above.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A false division bar assembly for a vehicle, comprising:
a division bar mounted in a vehicle rear door window opening to create at least two air passages on opposite sides of said division bar within the vehicle rear door window opening, to thereby reduce wind noise generated during movement of the vehicle when the vehicle front windows are closed with the vehicle rear windows being opened.

2. The false division bar assembly of claim 1, wherein said division bar is disposed at approximately ⅓ the length of the vehicle rear door window opening from an opening end adjacent a vehicle rear end.

3. The false division bar assembly of claim 1, wherein said division bar includes a width of approximately 30-60mm, and a thickness of approximately 15-30mm.

4. The false division bar assembly of claim 1, wherein said division bar is retractable within a vehicle rear door.

5. The false division bar assembly of claim 1, wherein said division bar provides a wind generated noise reduction of at least 16 dB.

* * * * *